United States Patent
Ichikawa et al.

(10) Patent No.: US 9,819,164 B2
(45) Date of Patent: Nov. 14, 2017

(54) WIRE HARNESS INTERMEDIATE MEMBER, AND WIRE HARNESS

(71) Applicant: YAZAKI CORPORATION, Tokyo (JP)

(72) Inventors: Hidehiro Ichikawa, Shizuoka (JP); Makoto Katsumata, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/300,050

(22) Filed: Jun. 9, 2014

(65) Prior Publication Data

US 2014/0284102 A1    Sep. 25, 2014

Related U.S. Application Data

(63) Continuation of application No. PCT/JP2012/084283, filed on Dec. 26, 2012.

(30) Foreign Application Priority Data

Dec. 27, 2011    (JP) ................. 2011-284654

(51) Int. Cl.
  *H01B 7/00*    (2006.01)
  *H02G 3/04*    (2006.01)
  (Continued)

(52) U.S. Cl.
  CPC ....... *H02G 3/0625* (2013.01); *B60R 16/0215* (2013.01); *H01R 9/034* (2013.01)

(58) Field of Classification Search
  CPC ............ B60L 11/1803; B60L 2220/46; B60L 2270/145; B60R 16/0215; H01R 4/18;
  (Continued)

(56) References Cited

U.S. PATENT DOCUMENTS 5,691,506 A      11/1997    Miyazaki et al.
6,211,459 B1 *   4/2001    O'Groske ............. H01B 11/10
                                                        174/36
(Continued)

FOREIGN PATENT DOCUMENTS

CN       102088171 A        6/2011
DE    10 2007 053 459 A1    5/2008
(Continued)

OTHER PUBLICATIONS

Chinese Office Action and English translation for the related Chinese Patent Application No. 201280065299.8 dated Aug. 7, 2015.
(Continued)

*Primary Examiner* — Timothy Thompson
*Assistant Examiner* — Guillermo Egoavil
(74) *Attorney, Agent, or Firm* — Kenealy Vaidya LLP (57) ABSTRACT

An intermediate member that enables enhancement of ease of fabrication of a wire harness and a wire harness including such an intermediate member are provided. A wire harness is divided into an intermediate member placed in an intermediate portion of the wire harness and two terminal members placed at respective terminals of the wire harness and to be connected to equipment. After being separately fabricated, the intermediate member and the two terminal members are connected together, whereupon fabrication of the wire harness is completed. The intermediate member includes one or a plurality of intermediate conducting paths, intermediate routing path retaining means retaining a cable routing path geometry of the intermediate conducting paths; intermediate shield means covering and shielding the intermediate conducting paths; and intermediate protection means covering and protecting the intermediate conducting paths.

8 Claims, 10 Drawing Sheets (51) Int. Cl.
*H02G 3/06* (2006.01)
*B60R 16/02* (2006.01)
*H01R 9/03* (2006.01)

(58) Field of Classification Search
CPC .......... H01R 4/28; H01R 4/184; H01R 4/646;
H01R 4/726; H01R 9/032; H01R 9/034;
H01R 9/0512; H01R 9/0518; H01R
9/0527; H01R 13/52; H01R 13/648;
H01R 13/5205; H01R 13/5808; H01R
24/562; H01R 2105/00; H01R 2201/26;
H02G 3/0462; H02G 3/0625; H05K
9/0018; H05K 9/0098; Y02T 10/7005;
Y10T 29/49169; Y10T 307/492
USPC ......... 29/854; 174/34, 72 A, 84 R, 359, 652;
307/9.1, 42; 439/98
See application file for complete search history.

(56) References Cited

U.S. PATENT DOCUMENTS

| | | | |
|---|---|---|---|
| 9,002,423 B2 * | 4/2015 | Jang et al. | 505/163 |
| 9,006,939 B2 | 4/2015 | Toyama et al. | |
| 2004/0057187 A1 * | 3/2004 | Kuboshima | H01R 9/032 |
| | | | 361/118 |
| 2004/0099427 A1 | 5/2004 | Kihira | |
| 2005/0239326 A1 * | 10/2005 | Ishikura | H01R 13/52 |
| | | | 439/568 |
| 2006/0030171 A1 * | 2/2006 | Hung | H05K 1/118 |
| | | | 439/67 |
| 2006/0254801 A1 * | 11/2006 | Stevens | 174/102 R |
| 2006/0278423 A1 * | 12/2006 | Ichikawa | B60R 16/0215 |
| | | | 174/72 A |
| 2007/0167040 A1 * | 7/2007 | Ogawa | H01R 13/6599 |
| | | | 439/76.2 |
| 2008/0113559 A1 | 5/2008 | Hamai et al. | |
| 2009/0178825 A1 * | 7/2009 | Wu | H01B 7/425 |
| | | | 174/113 R |
| 2009/0272576 A1 | 11/2009 | Medina | |
| 2011/0031809 A1 * | 2/2011 | Yoshida | B60R 16/0215 |
| | | | 307/42 |
| 2011/0133548 A1 | 6/2011 | Toyama et al. | |
| 2011/0168423 A1 * | 7/2011 | Hagi | H01R 4/726 |
| | | | 174/34 |
| 2014/0251682 A1 * | 9/2014 | Ichikawa | B60R 16/0215 |
| | | | 174/72 A |

FOREIGN PATENT DOCUMENTS

| | | | | |
|---|---|---|---|---|
| DE | 10 2010 062 080 A1 | 6/2011 | | |
| EP | 0 381 024 A2 | 8/1990 | | |
| EP | 0 704 940 A2 | 4/1996 | | |
| FR | WO 2011076819 A3 * | 5/2012 | .......... | H01R 9/0503 |
| JP | 2004-171952 A | 6/2004 | | |
| JP | 2006-312409 A | 11/2006 | | |
| JP | 2009-214631 A | 9/2009 | | |
| JP | WO 2011096478 A1 * | 8/2011 | ......... | B60R 16/0215 |
| WO | 2006/034516 A1 | 4/2006 | | |
| WO | WO 2011011776 A1 * | 1/2011 | | |
| WO | WO2011096478 A1 * | 11/2011 | | |

OTHER PUBLICATIONS

International Search Report and Written Opinion of the International Search Report for PCT/JP2012/084283 dated Apr. 29, 2013.
Japanese Office Action for the related Japanese Patent Application No. 2011-284654 dated Apr. 20, 2016.
Japanese Office Action for the related Japanese Patent Application No. 2011-284654 dated Sep. 29, 2015.
Communication Pursuant to Article 94(3) EPC for European Patent App. No. 12826635.0 (dated Dec. 21, 2016).

* cited by examiner

WIRE HARNESS INTERMEDIATE MEMBER, AND WIRE HARNESS

CROSS REFERENCE TO RELATED APPLICATIONS

This application is a continuation of PCT application No. PCT/JP2012/084283, which was filed on Dec. 26, 2012 based on Japanese Patent Application (No. 2011-284654) filed on Dec. 27, 2011, the contents of which are incorporated herein by reference.

BACKGROUND OF THE INVENTION

1. Field of the Invention

The invention relates to a high-voltage wire harness to be routed in a movable body, such as an automobile, and an intermediate member serving as a member that makes up the wire harness.

2. Description of the Related Art

High voltage wire harnesses have hitherto been used to electrically interconnect pieces of equipment of a hybrid automobile and an electric vehicle; that is, a motor unit, an inverter unit, a battery, and the like.

A wire harness disclosed in Patent Document 1 to be described below includes three electric wires for electrically interconnecting pieces of equipment; a main shield that houses most of entire lengths of the three electric wires; and a sub-shield that covers the three electric wires that extend from an end of the main shield. Depending on a location where equipment is mounted, a cable routing path of the wire harness becomes very long.

Each of terminals of the three electric wires is provided with terminal fitting. After fabrication of the wire harnesses, the terminal fitting is to be inserted into a shield case of the equipment along with the ends of the electric wires and connected to a connection part placed at a predetermined location on a equipment body by means of; for instance, bolting.

An electrically conducting metal pipe is used for the main shield. In order to reduce a diameter of the main shield, the main shield is formed so as to assume an inner diameter that enables insertion of only three electric wires.

The sub-shield is made up of a cylindrically-formed braid; a shield shell fastened to one end of the braid; and a connection pipe fastened to the other end of the braid. The braid and the shield shell are arranged, one superposed on the other. A shield ring is laid on the superposed portion, and the shield ring is subsequently swaged, to thus fix the braid and the shield shell. Such fixing is also used for fastening the braid to the connection pipe. Specifically, the braid and the connection pipe are superposed one on another, and swaging rings are placed on such an overlap. The swaging rings are subsequently swaged, to thus fasten the braid and the shield shell.

A metal pipe that is made from the same material as that of the main shield and has the same inner diameter of the main shield is used for the connection pipe. The connection pipe is formed so as to become shorter by far than the main shield. After an end of the connection pipe is brought in agreement with an end of the main shield, the connection pipe is welded.

CITATION LIST

Patent Literature

[PTL 1] Japanese Patent Publication No. JP-A-2004-171952

SUMMARY OF THE INVENTION

The wire harness described in Patent Document 1 must be fabricated while remaining fully extended. Therefore, when viewed as a whole, the wire harness encounters a problem of poor productivity.

The invention has been conceived in light of the circumstance, and a challenge to be met by the invention is to provide an intermediate member that enables enhancement of productivity of a wire harness. Another challenge is to provide a wire harness including such an intermediate member.

In order to achieve the object described above, a wire harness intermediate member and a wire harness according to the invention is characterized by the following (1) to (3).

(1) A wire harness intermediate member to be interposed between two terminal members that are structured to be electrically connected to equipment and flexibly bendable in a desired direction, comprising:

one or a plurality of intermediate conducting paths configured to establish an electrical interconnect between the two terminal members;

intermediate routing path retaining means configured to retain a routing path geometry of the one or the plurality of intermediate conducting paths;

intermediate shield means configured to cover and electromagnetically shield the one or the plurality of intermediate conducting paths; and intermediate protection means configured to cover and protect the one or the plurality of intermediate conducting paths, wherein the wire harness intermediate member is fabricated separately from the two terminal members.

(2) The wire harness intermediate member according to the above (1), wherein a single component serves as the intermediate routing path retaining means, the intermediate shield means, and the intermediate protection means.

(3) A wire harness comprising:

the wire harness intermediate member defined in the above (1) or (2); and two terminal members that are structured to establish an electrical interconnect through the wire harness intermediate member, the two terminal members being electrically connected to equipment and flexibly bendable in a desired direction.

According to the invention having the foregoing characteristics, there is provided, as a wire harness intermediate member, a member including one or a plurality of intermediate conducting paths, intermediate routing path retaining means, intermediate shield means, and intermediate protection means. A wire harness taking the intermediate member as one constituent member is also provided. The invention adopts the intermediate member, and the intermediate member is fabricated separately from the two terminal members for use with the wire harness. There is obviated a necessity to fabricate the wire harness in length state from the beginning. Specifically, the wire harness is divided into the two terminal members to be connected to equipment and the intermediate member of the invention to be interposed between the two terminal members. Therefore, fabrication of a wire harness can be carried out in short length on a per-member basis. Since the intermediate member is shorter than the entire length of the wire harness, ease of handling achieved during fabrication is also superior.

Under the invention, fabrication of the wire harness is carried out in a lengthy state only during connection of one terminal member with the intermediate member and connection of the remaining terminal member with the intermediate member that are intended to finish a final wire harness.

The invention defined in the above (1) enables provision of a wire harness intermediate member as a member to be placed in a middle of a wire harness. As a result of adoption of the intermediate member, there is yielded an advantage of the ability to enhance ease of fabrication of the wire harness when compared with that achieved in the related art.

In addition to yielding the advantage of the above (1), the invention defined in the above (2) yields the following advantage. Specifically, a single component serves as the intermediate routing path retaining means, the intermediate shield means, and the intermediate protection means that make up the wire harness intermediate member, so that there is yielded an advantage of the ability to realize an intermediate member involving a smaller number of components.

The invention defined in the above (3) adopts the wire harness intermediate member defined in the above (1) or (2), thereby yielding an advantage of the ability to enhance ease of fabrication of the wire harness when compared with that achieved in the related art.

BRIEF DESCRIPTION OF THE DRAWINGS

FIGS. 1A and 1B are drawings of a wire harness of the invention, wherein

DETAILED DESCRIPTION OF THE EXEMPLARY EMBODIMENTS

A wire harness assumes a structure that is divided into an intermediate member placed in an intermediate portion of the wire harness and two terminal members that are placed respectively at both terminal portions of the wire harness and that are connected to equipment. After being separately fabricated, the intermediate member and the two terminal members are finally connected together, whereby fabrication of the wire harness is completed. The intermediate member includes one or a plurality of intermediate conducting paths, intermediate routing path retaining means that retains a cable routing path geometry of the one or the plurality of intermediate conducting paths; intermediate shield means that covers and shields the one or the plurality of intermediate conducting paths, and intermediate protection means that covers and protects the one or the plurality of intermediate conducting paths.

Embodiments

Figure 1A:
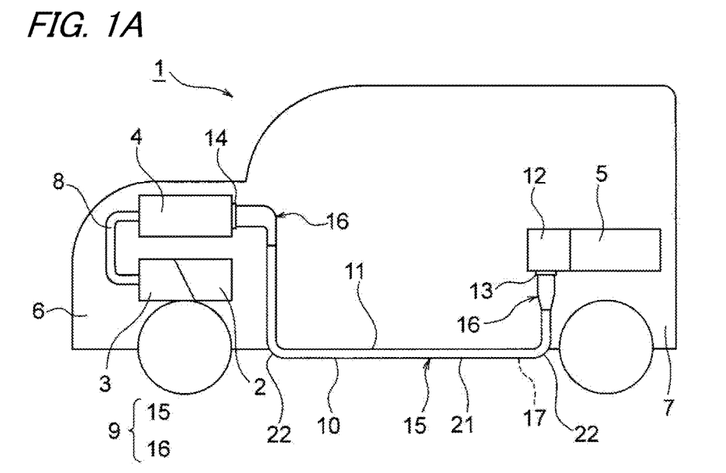
FIG. 1A is a schematic view showing a routed state of the wire harness.
Figure 1B:
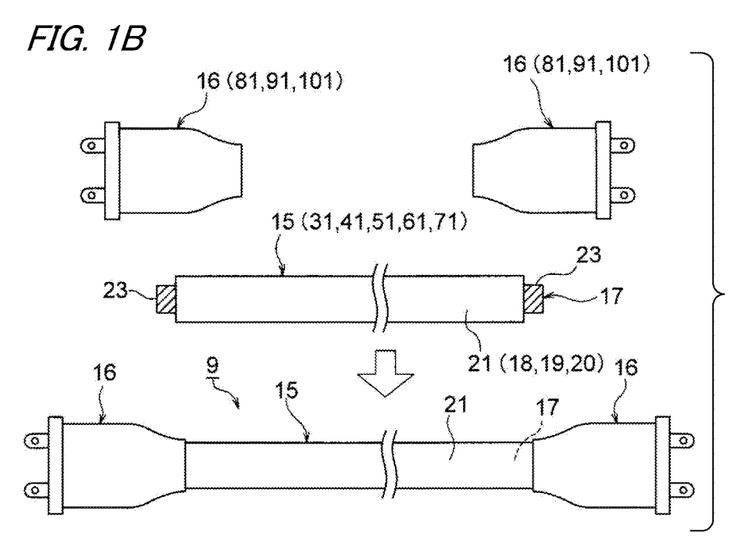
FIG. 1B is a schematic view showing a procedure of fabricating the wire harness.
Figure 7:
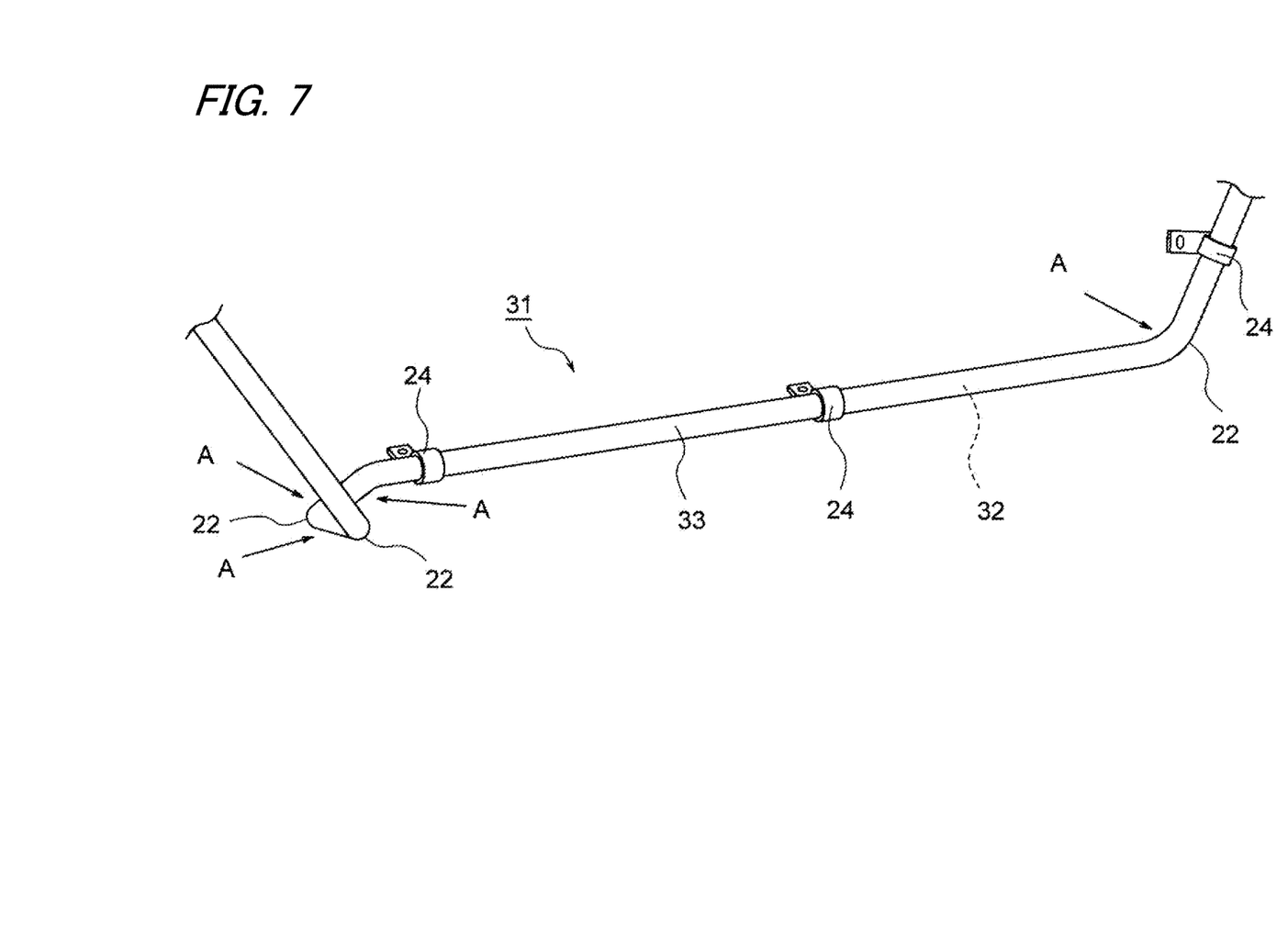
FIG. 7 is a perspective view showing a bent shape of the intermediate member.
Figure 8:
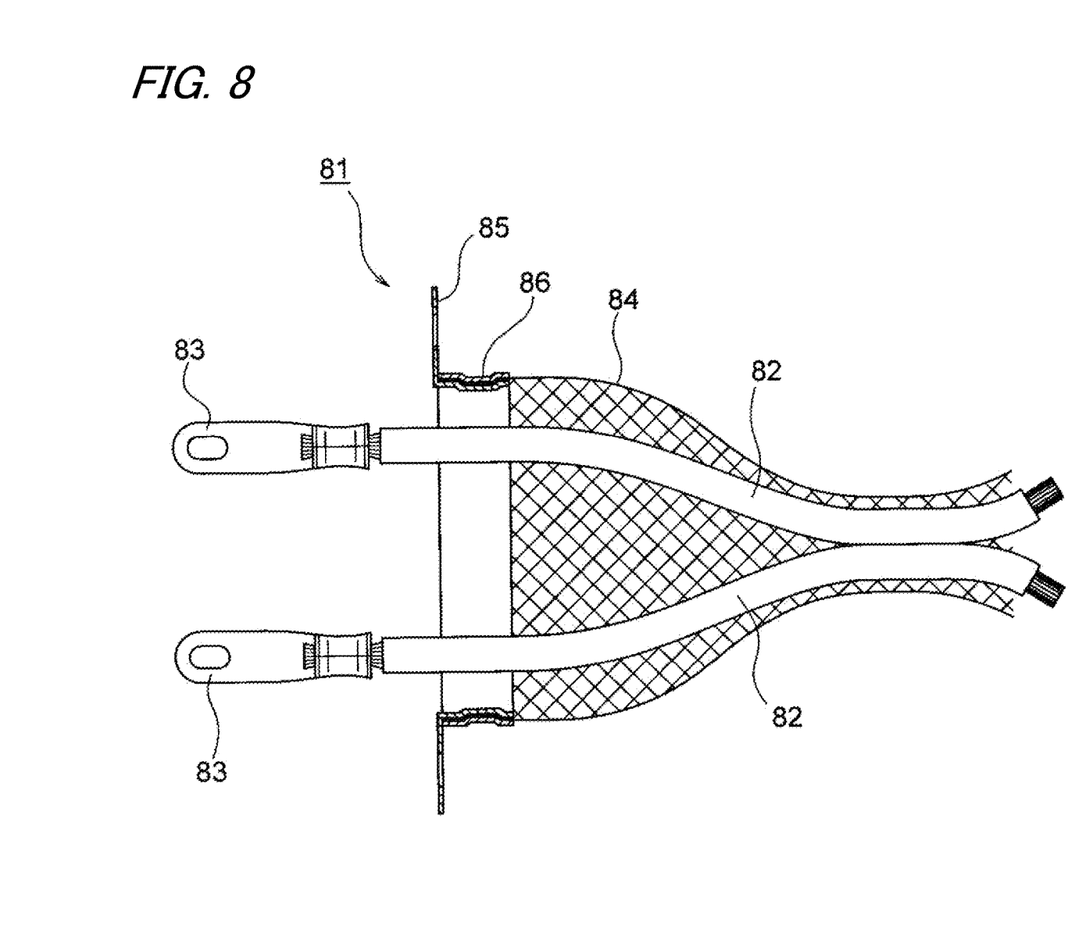
FIG. 8 is a cross sectional view showing a structure of a terminal member that is to serve as a first example.
Figure 9:
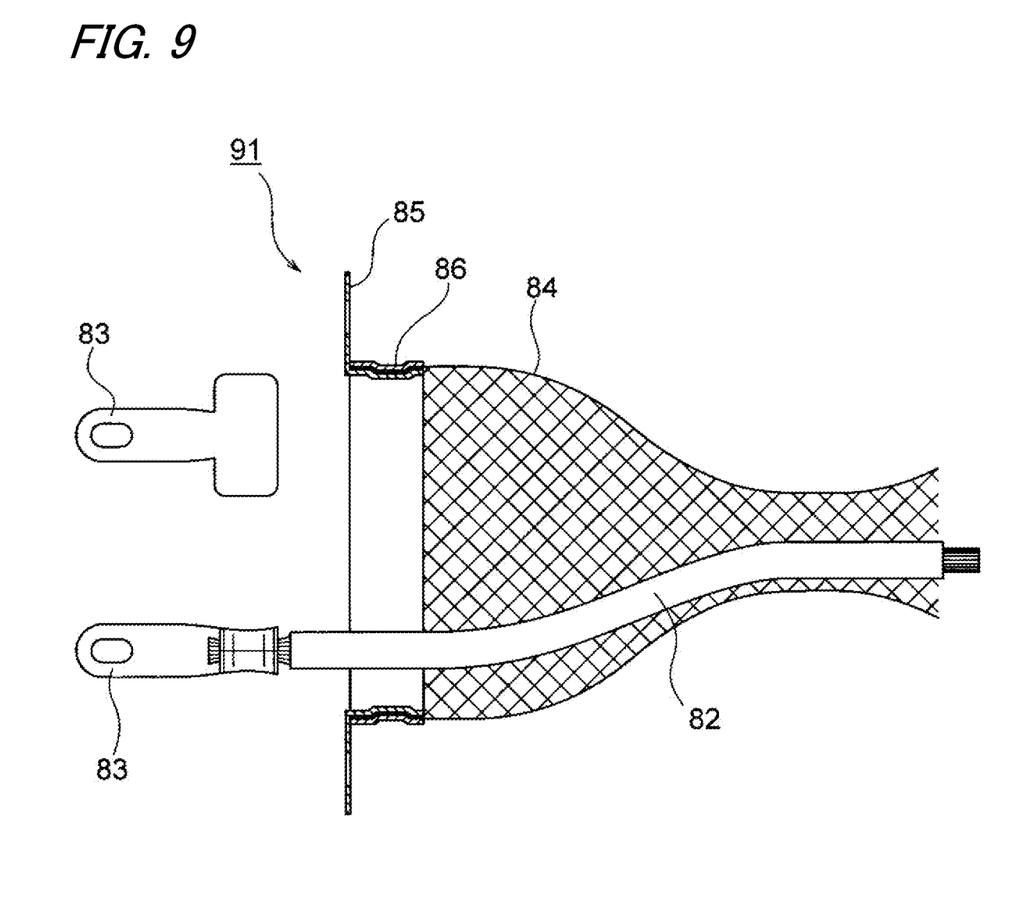
FIG. 9 is a cross sectional view showing a structure of a terminal member that is to serve as a second example.
Figure 10:
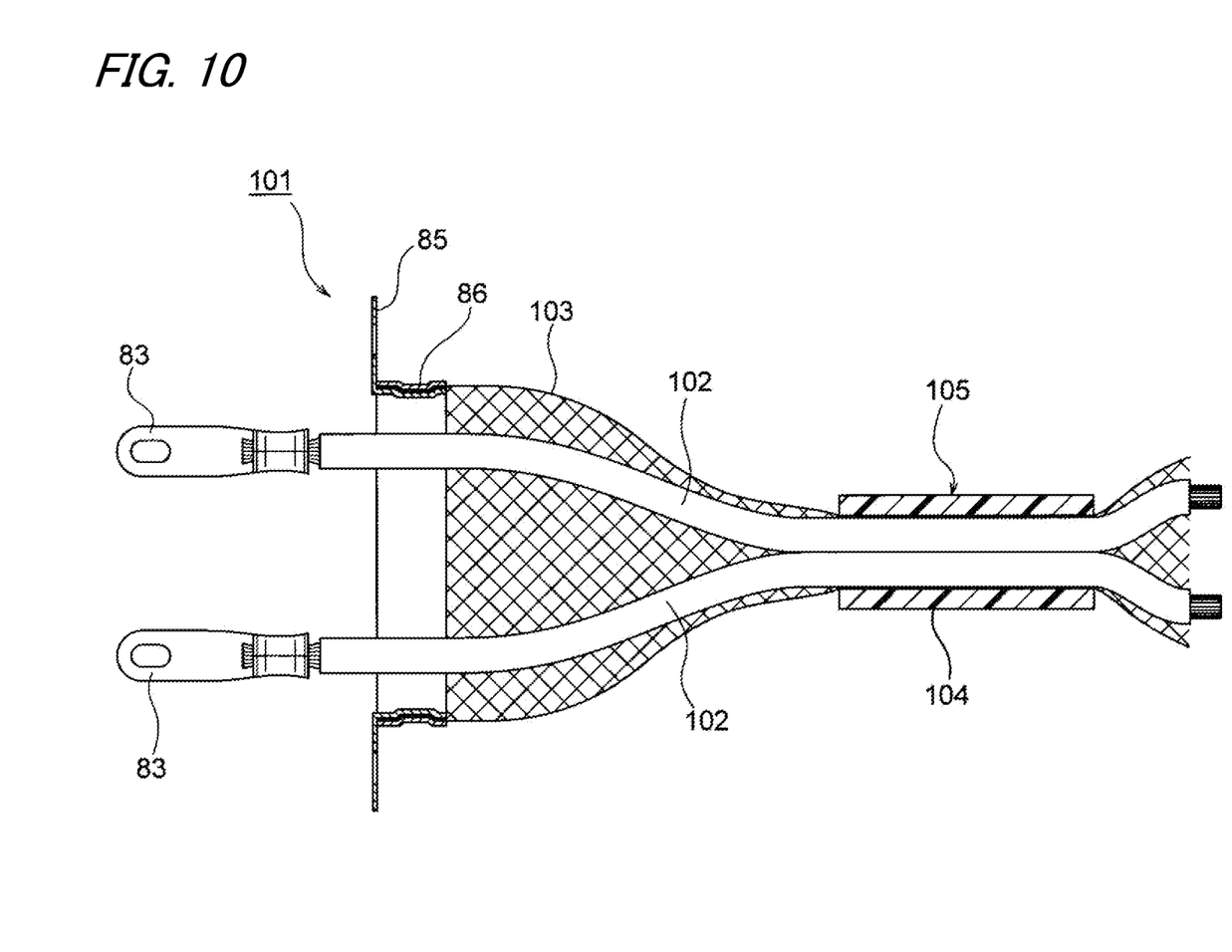
FIG. 10 is a cross sectional view showing a structure of a terminal member that is to serve as a third example.

Embodiments are hereunder described by reference to the drawings. FIGS. 1A and 1B are drawing of a wire harness of the invention, wherein FIG. 1A is a schematic view showing a routed state of the wire harness, and FIG. 1B is a schematic view showing a procedure of fabricating a wire harness. FIGS. 2A and 2B, FIGS. 3A and 3B, FIGS. 4A and 4B, FIG. 5, and FIGS. 6A and 6B are cross sectional views of an intermediate member. FIG. 7 is a perspective view showing a bent shape of the intermediate member. FIGS. 8 to 10 are cross sectional views of a terminal member.

The embodiments shall be described by reference to examples that adopt wire harnesses of the invention in a hybrid automobile (which may also be either an electric vehicle or a common automobile).

In FIG. 1, reference numeral 1 designates a hybrid automobile. The hybrid automobile 1 is a vehicle that is driven by a mixture of two types of power from an engine 2 and a motor unit 3. The motor unit 3 is configured so as to be supplied with electric power from a battery 5 (a battery pack) by way of an inverter unit 4. The engine 2, the motor unit 3, and the inverter unit 4 are mounted in an engine room 6 where front wheels, or the like, are situated, in the embodiment. The battery 5 is mounted in an automobile rear block 7 where rear wheels, or the like, are situated (the battery can also be mounted in an automobile compartment located behind the engine room 6).

The motor unit 3 and the inverter unit 4 are connected to each other by means of a known high voltage wire harness 8. The battery 5 and the inverter unit 4 are connected together by means of a wire harness 9 of the invention (i.e., a high voltage wire harness for an automobile). The wire harness 9 is configured as one intended for use with a high voltage. An intermediate portion 10 of the wire harness 9 is routed on a ground side of a vehicle body underfloor portion 11. The wire harness 9 is also routed substantially in parallel with the vehicle body underfloor portion 11. The vehicle body underfloor portion 11 corresponds to both a known body and a so-called panel member. A through hole (whose reference numeral is omitted) is formed in a predetermined position. The wire harness 9 is inserted into the through hole.

The wire harness 9 and the battery 5 are connected to each other by way of a junction block 12 provided for the battery 5. A rear end 13 of the wire harness 9 is electrically connected to the junction block 12 by means of a known method. A front end 14 of the wire harness 9 is electrically connected to the inverter unit 4 by means of a known method.

Exemplary connecting portions (terminal members) relevant to the foregoing electrical connection will be described later by reference to FIGS. 8 to 10.

The motor unit 3 is configured to include a motor and a generator. Further, the inverter unit 4 is configured to include an inverter and a converter. The motor unit 3 is formed as a motor assembly including a shield case. The inverter unit 4 is also formed as an inverter assembly including a shield case. The battery 5 is an Ni-MH-based or Li-ion-based battery and moduralized. For instance, a rechargeable battery; for instance, a capacitor, can also be used. The battery 5 is not limited to any specific type, so long as it can be used for the hybrid automobile 1 or the electric vehicle.

First, a configuration and a structure of the wire harness 9 are described. The wire harness 9 is, as mentioned above, a high voltage member for electrically connecting two pieces of equipment, or the inverter unit 4 and the battery 5, and includes an intermediate member 15 and two terminal members 16, one connected to the inverter unit 4 and the other connected to the battery 5. After being separately fabricated, the intermediate member 15 and the two terminal members 16 are assembled into one, whereby the wire harness 9 is fabricated.

The intermediate member 15 is configured to include one or a plurality of intermediate conducting paths 17, intermediate routing path retaining means 18 that retains a cable routing path geometry of the one or the plurality of intermediate conducting paths 17; intermediate shield means 19 that covers and electromagnetically shields the one or the plurality of intermediate conducting paths 17, and intermediate protection means 20 that covers and protects the one or the plurality of intermediate conducting paths 17.

In FIG. 1B, a single component serves as the intermediate routing path retaining means 18, the intermediate shield means 19, and the intermediate protection means 20; specifically, an exterior cladding member 21 does (the case where only the exterior cladding member 21 serves as the three means is a mere embodiment). A conducting metallic tubular body is mentioned as one example of the exterior cladding member 21.

When a predetermined position on the intermediate member 15 is subjected to bending, a bent shape (a cable routing path geometry) matching a cable routing path is thereupon formed. The bent shape is retained. Reference numeral 22 designates a bend.

By reference to FIGS. 2A and 2B, FIGS. 3A and 3B, FIGS. 4A and 4B, FIG. 5, FIGS. 6A and 6B, and FIG. 7, a specific embodiment of the intermediate member 15 will be described later.

The one or the plurality of intermediate conducting paths 17 are formed in such a length that both terminals 23 protrude from both ends of the exterior cladding member 21. The one or the plurality of intermediate conducting paths 17 are formed such that the respective terminals 23 protrude from the exterior cladding member 21 to thereby enable connections with the respective terminal members 16.

The two terminal members 16 have a flexible structure that enables bending in a desired direction as well as a structure such that one is electrically connected to the inverter unit 4 and the other is connected to the battery 5. The two terminal members 16 are formed in such a way that the intermediate member 15 can be interposed therebetween.

A specific embodiment of the two terminal members 16 will be described later by reference to FIGS. 8 to 10.

The wire harness 9 adopts the intermediate member 15 having the foregoing configuration and structure. Moreover, the intermediate member 15 is fabricated separately from the two terminal members 16. These obviate a necessity to fabricate the wire harness 9 in an extended state from the beginning. Specifically, the wire harness 9 is separated into the two terminal members 16, one connected to the inverter unit 4 and the other connected to the battery 5, and the intermediate member 15 interposed therebetween, so that fabrication of the wire harness can be carried out in short length on a per-member basis. Accordingly, ease of fabrication can be enhanced further when compared with the related art.

Since fabrication of the wire harness 9 can be carried out in short length on a per-member basis, ease of handling achieved during fabrication of the wire harness can also be improved.

A specific embodiment of the intermediate member 15 is now described by reference to FIGS. 2A and 2B, FIGS. 3A and 3B, FIGS. 4A and 4B, FIG. 5, FIGS. 6A and 6B, and FIG. 7.

Figure 2A:
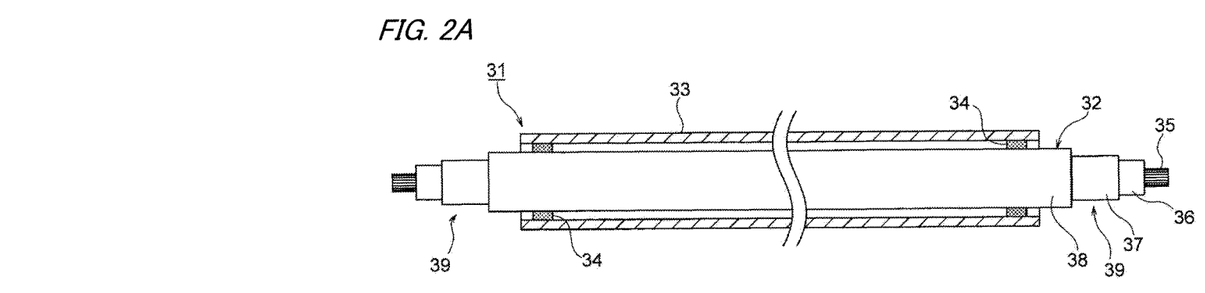
FIG. 2A is a cross sectional view showing a structure of an intermediate member that is to serve as a first example.

In FIG. 2A, an intermediate member 31 serving as a specific embodiment (a first example) is configured to include a high voltage coaxial composite conducting path 32, an exterior cladding member 33, and conducting path retaining members 34. The high voltage coaxial composite conducting path 32 corresponds to the intermediate conducting path, and the exterior cladding member 33 corresponds to the intermediate routing path retaining means, the intermediate shield means, and the intermediate protection means. It is arbitrary to let the structure of the intermediate member include the conducting path retaining members 34.

The high voltage coaxial composite conducting path 32 is configured such that only a single path includes both a plus circuit and a minus circuit; specifically, such that the path accommodates double circuitry. More specifically, the high voltage coaxial composite conducting path 32 is configured so as to include a first conducting path 35 that is situated at a center of the high voltage coaxial composite conducting path 32 and that assumes a circular cross sectional profile; a first insulator 36 that sheathes an outer periphery of the first conducting path 35 in a predetermined thickness; a second conducting path 37 laid outside the first insulator 36; and a second insulator 38 that sheathes an outer periphery of the second conducting path 37 in a predetermined thickness.

In the configuration of the high voltage coaxial composite conducting path 32, the first conducting path 35 is presumed to correspond to either a plus conductor or a minus conductor. The second conducting path 37 is presumed to correspond to a remaining one of the two.

The first conducting path 35 is produced from copper, a copper alloy, aluminum, or an aluminum alloy. The first conducting path 35 can also adopt a conductor structure made by twisting strands or a rod-shaped conductor structure assuming; for instance, a circular cross sectional profile (e.g., a conductor structure that will make up a round single core).

The first insulator 36 is a sheath for the first conducting path 35 and formed by extruding a known resin material.

The second conducting path 37 is produced from copper, a copper alloy, aluminum, or an aluminum alloy. The second conducting path 37 is not restricted to any specific structure, so long as the second conducting path 37 can exhibit a function equivalent to a remaining one of the two; namely, the plus conductor and the minus conductor.

A braided conductor made by braiding electrically conductive strands into a tubular shape is presumed to be provided as an example of the second conducting path 37. A metal foil conductor formed by making electrically conductive metal foil into a tubular shape is also presumed to be provided as an example of the second conducting path 37. In addition, a spiral conductor made by turning an electrically conductive metal wire into a spiral structure is also presumed to be provided as the example. A metal wire assuming a circular or rectangular cross sectional profile, a metal wire assuming the shape of a band plate, a metal wire made up of a bare electric wire, and the like, are presumed to be provided as metal wires for the spiral conductor.

A pipe conductor made up of an electrically conductive metal pipe is presumed to be provided as an example of the second conducting path 37. The metal pipe is to be fabricated by extrusion or rounding a metal plate into a pipe shape. The example of the second conducting path 37 is presumed to include a strand conductor that is fabricated by placing a plurality of electrically conductive strands around the first insulator 36 or a strand conductor that is fabricated by unbraiding a bare wire and placing the thus-unbraided wires around the first insulator 36. Moreover, a tape conductor using an electrically conductive metal tape is presumed to be provided as an example of the second conducting path 37.

A conductor cross sectional area (a cross sectional area of a portion that works as a conductor) of the second conducting path 37 is set so as to be commensurate with a conductor cross sectional area of the first conducting path 35. If the second conducting path 37 is formed from a braided conductor, a spiral conductor, or a strand conductor, the second conducting path 37 may become longer than the first conducting path 35 in terms of the length of the conductor. In such a case, it is effective to make the conductor cross sectional area of the second conducting path 37 slightly larger than that of the first conducting path 35 so as to absorb a difference in conductor length.

In relation to the conductor cross sectional area, the conductor cross sectional area of the second conducting path 37 is made slightly larger in a case where the conductor cross sectional area (or a conductor diameter) of the second conducting path 37 is set so as to be exactly commensurate with a value of an electric current flowing through the first conducting path 35 that is to act as a core wire. If the conductor cross sectional area of the second conducting path 37 is set while making an allowance rather than being set so as to exactly match that of the first conducting path 35, the conductor cross sectional area of the second conducting path 37 can also be made equal (equivalent) to that of the first conducting path 35 without an increase. If the allowance is made, the conductor cross sectional area of the second conducting path 37 can also be made slightly smaller.

If the conductor cross sectional area of the second conducting path 37 is made slightly larger, a slight increase will occur in the number of strands when the second conducting path 37 is; for instance, a strand conductor, and will not affect the diameter of the high voltage coaxial composite conducting path 32. In the meantime, if the conductor cross sectional area of the second conducting path 37 is set while making an allowance for the value of the electric current flowing through the first conducting path 35, making the conductor cross sectional area of the second conducting path 37 slightly smaller is effective for reducing the diameter of the high voltage coaxial composite conducting path 32.

Even when the conductor cross sectional area of the second conducting path 37 is set while making an allowance for the value of the electric current flowing through the first conducting path 35, the conductor cross sectional area including the allowance is extremely small and will not affect the diameter of the high voltage coaxial composite conducting path 32.

In addition to this, since the conductor cross sectional area of the second conducting path 37 is set in accordance with the conductor cross sectional area of the first conducting path 35, a thickness (wall thickness) of the second conducting path 37 will not increase even when the second conducting path 37 is a pipe conductor made of; for instance, a metal pipe. As a matter of course, the high voltage coaxial composite conducting path 32 will be significantly smaller than a metal pipe hitherto used as an exterior cladding member in terms of a thickness and a diameter.

The second insulator 38 is a sheath for the second conducting path 37 and formed by extrusion of a known resin material. The second insulator 38 is formed as a region for protecting the second conducting path 37 and, in addition, as a region for insulating the second conducting path 37 from a member that exhibits a shielding function.

Both terminals 39 of the high voltage coaxial composite conducting path 32 are processed in such a way that the second insulator 38 is peeled off to thereby bare a predetermined length of the second conducting path 37 and that the first insulator 36 is peeled off to thereby bare a predetermined length of the first conducting path 35. Although processing timing is arbitrary, processing is to be performed at appropriate timing (e.g., after the high voltage coaxial composite conducting path 32 is accommodated in the exterior cladding member 33) in consideration of ease of fabrication of the intermediate member 31.

The exterior cladding member 33 is a tubular body made of metal; namely, a metal tubular body, and formed so as to have a length that enables accommodation of portions of the high voltage coaxial composite conducting path 32 except its terminals 39. In the embodiment, the exterior cladding member 33 is formed so as to assume a circular cross sectional profile (the cross sectional profile shall be a mere example and may also be an ellipsoidal shape, an oval shape, or a rectangular shape).

An aluminum pipe having a circular cross sectional profile (shall be a mere example) is used for the exterior cladding member 33 in the embodiment. The exterior cladding member 33 is formed so as to roughly assume an inner diameter that enables accommodation of the high voltage coaxial composite conducting path 32. The exterior cladding member 33 has a thickness of being able to exhibit a protective function. Since a thing to be accommodated is the high voltage coaxial composite conducting path 32, an outer diameter D1 (see FIG. 6A) is set to a comparatively small value (this will be described later by reference to FIG. 6A).

The conducting path retaining members 34 are formed into those that can retain and inhibit slippage of the high voltage coaxial composite conducting path 32 while inserted in the exterior cladding member 33. The conducting path retaining members 34 are made of elastomer; for instance, rubber, and exhibit elasticity. The conducting path retaining members 34 are formed from a material that exhibits superior heat conductivity and efficiently transmit the heat building up in the high voltage coaxial composite conducting path 32 to the exterior cladding member 33, to thus dissipate the heat.

In relation to heat dissipation, holding the high voltage coaxial composite conducting path 32 in direct contact with the exterior cladding member 33 is also effective (heat dissipation will be described later by reference to FIGS. 6A and 6B).

Providing the conducting path retaining members 34 yields an advantage of the ability to stabilize the position of the high voltage coaxial composite conducting path 32 during fabrication of the intermediate member 31 and connection of the intermediate member 31 to the two terminal members 16 (see FIG. 1B).

As has been described by reference to FIG. 2A, the intermediate member 31 is understood to be shorter than the entire length of the wire harness 9 (see FIG. 1). Moreover, the intermediate member 31 is also understood to have a smaller number of components from a structural viewpoint. Accordingly, the ease of fabrication of the intermediate member 31 can be said to be superior. Furthermore, ease of handling of the intermediate member 31 can also be said to be superior during fabrication.

Figure 2B:
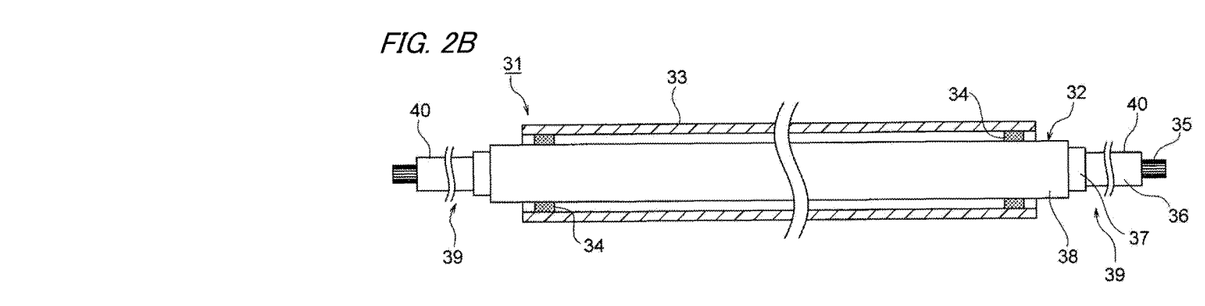
FIG. 2B is a cross sectional view showing a structure of the intermediate member that is to serve as a second example.

In FIG. 2B, the intermediate member 31 serving as a specific embodiment (a second example) is configured to include the high voltage coaxial composite conducting path 32, the exterior cladding member 33, and the conducting path retaining member 34. The high voltage coaxial composite conducting path 32 corresponds to the intermediate conducting path, and the exterior cladding member 33 corresponds to the intermediate routing path retaining means, the intermediate shield means, and the intermediate protection means. It is arbitrary to let the structure of the intermediate member include the conducting path retaining members 34.

The intermediate member 31 of the second example differs from the intermediate member 31 of the first example only in the high voltage coaxial composite conducting path 32. Explanations are hereunder given to the difference.

The high voltage coaxial composite conducting path 32 is identical with the high voltage coaxial composite conducting path 32 of the first example in terms of a structure and a layout. They differ from each other in that an extension 40 where the first conducting path 35 and the first insulator 36 are extended long in an axial direction is formed at each of the terminals 39. The extension 40 is provided at a portion of the high voltage coaxial composite conducting path 32 that is not covered with the exterior cladding member 33. Moreover, the extension 40 is made up of the first conducting path 35 and the first insulator 36 and hence exhibits flexibility. The intermediate member 31 is formed so as not to pose any hindrance in ease of fabrication and handling even when the extensions 40 are long.

As is evident from the above descriptions, the high voltage coaxial composite conducting path 32 of the second example is identical with, except the extensions 40, its counterpart described in connection with the first example. Hence, the same advantage as that described in connection with the first example is naturally yielded.

Figure 3A:
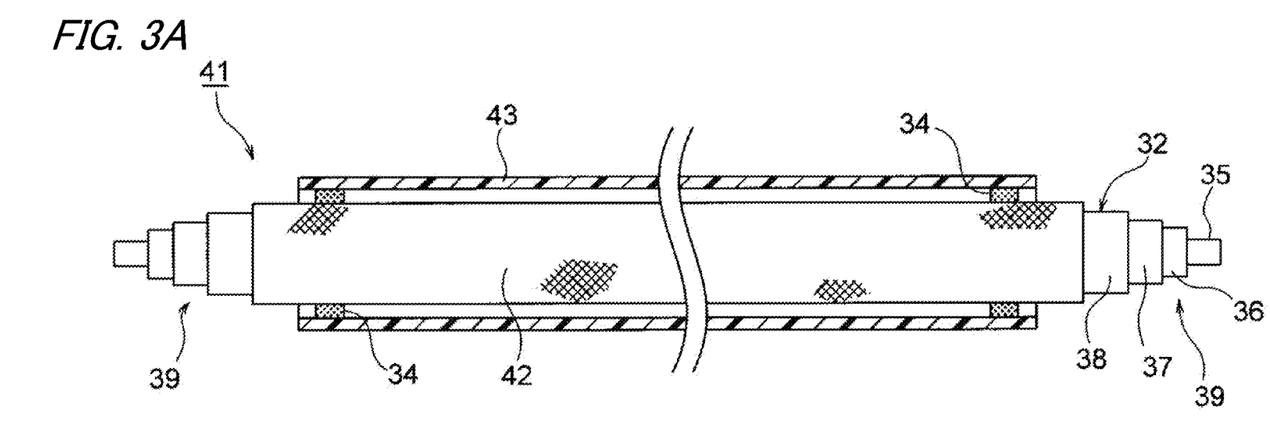
FIG. 3A is a cross sectional view showing a structure of an intermediate member that is to serve as a third example.

In FIG. 3A, an intermediate member 41 serving as a specific embodiment (a third example) is configured to include the high voltage coaxial composite conducting path 32, an electromagnetic shield member 42, an exterior cladding member 43, and the conducting path retaining member 34. The high voltage coaxial composite conducting path 32 corresponds to the intermediate conducting path, and a portion of the high voltage coaxial composite conducting path 32 corresponds to the intermediate routing path retaining means. Furthermore, the electromagnetic shield member 42 corresponds to the intermediate shield means, and the exterior cladding member 43 corresponds to the intermediate protection means. It is arbitrary to let the structure of the intermediate member include the conducting path retaining members 34.

In the high voltage coaxial composite conducting path 32, a conductor structure of the first conducting path 35 making up the high voltage coaxial composite conducting path 32 is set so as to exhibit rigidity that holds a cable routing path geometry of the intermediate member 41. In the embodiment, the first conducting path 35 that assumes; for instance, a rod-shaped conductor structure, is adopted.

The electromagnetic shield member 42 is a tubular member that covers the high voltage coaxial composite conducting path 32 and that can shield substantially the entire length of the high voltage coaxial composite conducting path 32. A braid is used in the embodiment (however, the electromagnetic shield member is not limited to the braid but can also be a known metal foil elementary substance, a film including a metallic foil, and the like). The braid is formed by twisting a plurality of ultrafine electrically conductive strands into a tubular shape. A metal strand made from soft copper, or the like, and a ultrafine strand made from non-metallic fibers are mentioned in relation to core wires. Carbon fibers or electrically conductive resin fibers formed from an electrically conductive material mixed in a resin material are mentioned as the non-metallic fibers.

In addition, a resin strand (a PET strand) can also be mixed in order to impart; for instance, abrasion resistance, to the foregoing strand. The electromagnetic shield member 42 can exhibit a protective function, so long as the electromagnetic shield member can be imparted with sufficient abrasion resistance. Hence, in this case, setting of the exterior cladding member 43 is arbitrary.

Since the electromagnetic shield member 42 is a member that exhibits flexibility, the electromagnetic shield member 42 does not pose any hindrance in ease of fabrication and handling even when became longer than the high voltage coaxial composite conducting path 32. The electromagnetic shield member 42 can double as an electromagnetic shield member 84 of each of terminal members 81 to be described later (when the electromagnetic shield member 42 doubles as the electromagnetic shield members 84, no hindrance will be posed in ease of fabrication and handling, so long as the electromagnetic shield member 42, for instance, is turned to an exterior side of the exterior cladding member 43).

The exterior cladding member 43 is a non-metallic tubular body; for instance, a plastic corrugated tube, a polyvinylchloride tube, and an elastomeric tube, and formed in a length that enables accommodation of portions of the high voltage coaxial composite conducting path 32 except its terminals 39. In the embodiment, the exterior cladding member 43 is formed so as to assume a circular cross sectional profile (the cross sectional profile shall be a mere example and may also be an ellipsoidal shape, an oval shape, or a rectangular shape).

Since the structure of the intermediate member 41 includes the electromagnetic shield member 42, the exterior cladding member 43 itself does not need to exhibit a shielding function. Further, since the first conducting path 35 of the high voltage coaxial composite conducting path 32 possesses rigidity, the exterior cladding member 43 itself does not need to exhibit a function of retaining a cable routing path geometry. For these reasons, in contrast with the case of the exterior cladding member 33 of the first example (see FIGS. 2A and 2B), an insulating flexible tubular body is adopted in the embodiment.

The exterior cladding member 43 is not limited to the non-metallic tubular body, and a metal tubular body; for instance, an aluminum pipe, can also be adopted (the exterior cladding member is not caused to function as intermediate shield means in the embodiment).

As has been described by reference to FIG. 3A, the intermediate member 41 is understood to be shorter than the entire length of the wire harness 9 (see FIG. 1B). Further, the intermediate member 41 is also understood to be small in the number of components from the structural viewpoint.

Accordingly, the ease of fabrication of the intermediate member 41 can be said to be superior. Moreover, ease of handling achieved during fabrication can also be said to be superior.

Figure 3B:
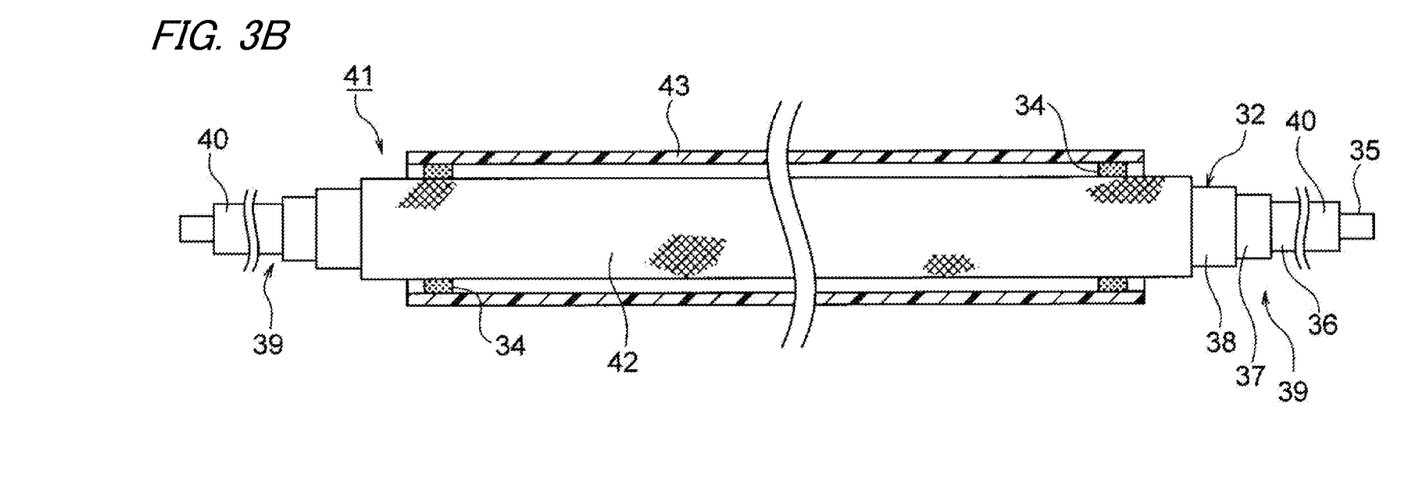
FIG. 3B is a cross sectional view showing a structure of the intermediate member that is to serve as a fourth example.

In FIG. 3B, the intermediate member 41 serving as a specific embodiment (a fourth example) is configured to include the high voltage coaxial composite conducting path 32, the electromagnetic shield member 42, the exterior cladding member 43, and the conducting path retaining member 34. The high voltage coaxial composite conducting path 32 corresponds to the intermediate conducting path, and a portion of the high voltage coaxial composite conducting path 32 corresponds to the intermediate routing path retaining means. Furthermore, the electromagnetic shield member 42 corresponds to the intermediate shield means, and the exterior cladding member 43 corresponds to the intermediate protection means. It is arbitrary to let the structure of the intermediate member include the conducting path retaining members 34.

The intermediate member 41 of the fourth example differs from the intermediate member 41 of the third example only in the high voltage coaxial composite conducting path 32. Explanations are hereunder given to the difference.

In the high voltage coaxial composite conducting path 32, the first conducting path 35 and the first insulator 36 of each of the terminals 39 are formed so as to be extended long in the axial direction, to thus form the extension 40. The extension 40 is provided at a portion of the high voltage coaxial composite conducting path 32 that is not covered with the exterior cladding member 43. Moreover, the extension 40 is made up of the first conducting path 35 and the first insulator 36 and hence exhibits flexibility. The intermediate member 41 is formed so as not to pose any hindrance in ease of fabrication and handling even when the extensions 40 are long.

As is evident from the above descriptions, the high voltage coaxial composite conducting path 32 of the fourth example is identical with, except the extensions 40, its counterpart described in connection with the third example. Hence, the same advantage as that described in connection with the third example is naturally yielded.

Figure 4A:
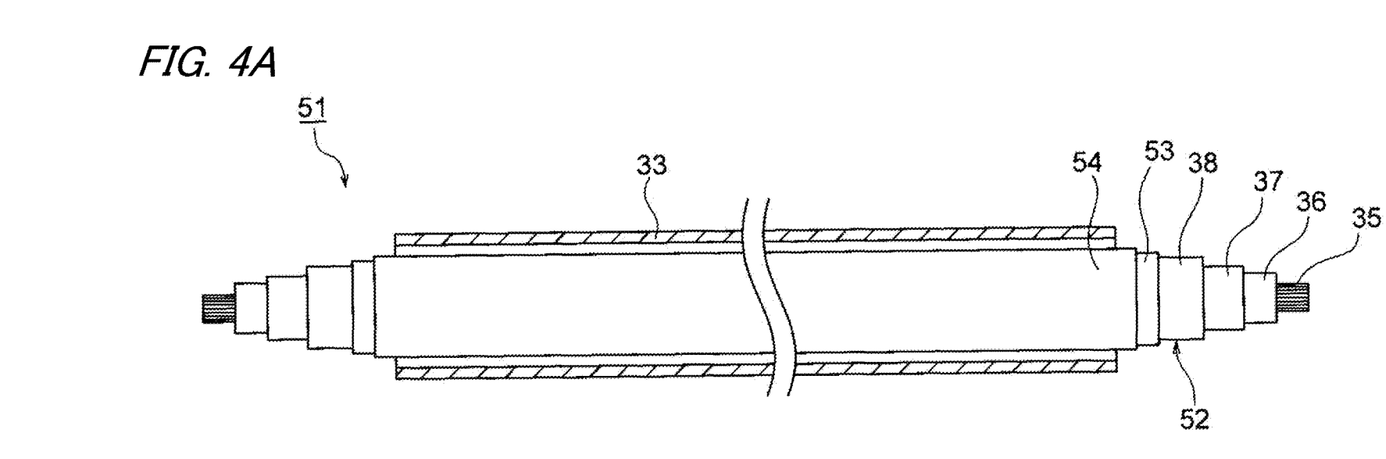
FIG. 4A is a cross sectional view showing a structure of an intermediate member that is to serve as a fifth example.

In FIG. 4A, an intermediate member 51 serving as a specific embodiment (a fifth example) is configured to include a high voltage coaxial composite conducting path 52 and the exterior cladding member 33 formed in conformance with a diameter of the high voltage coaxial composite conducting path 52. The high voltage coaxial composite conducting path 52 corresponds to the intermediate conducting path, and the exterior cladding member 33 corresponds to the intermediate routing path retaining means, the intermediate shield means, and the intermediate protection means. The high voltage coaxial composite conducting path 52 is hereunder described.

The high voltage coaxial composite conducting path 52 is configured such that only a single path includes three circuits (triple circuitry). More specifically, the high voltage coaxial composite conducting path 52 is configured so as to include the first conducting path 35 that is situated at a center of the high voltage coaxial composite conducting path 52 and that assumes a circular cross sectional profile; the first insulator 36 that sheathes an outer periphery of the first conducting path 35 in a predetermined thickness; the second conducting path 37 laid outside the first insulator 36; the second insulator 38 that sheathes an outer periphery of the second conducting path 37 in a predetermined thickness; a third conducting path 53 laid outside the second insulator 38; and a third insulator 54 that sheathes an outer periphery of the third conducting path 53 in a predetermined thickness.

In relation to a configuration of the high voltage coaxial composite conducting path 52, given that the high voltage coaxial composite conducting path 52 is connected to; for instance, a motor, the first conducting path 35, the second conducting path 37, and the third conducting path 53 correspond to three conducting paths (three circuits) for three phase AC currents. In contrast with the high voltage coaxial composite conducting path 32 of the first example (see FIGS. 2A and 2B), the high voltage coaxial composite conducting path 52 is formed to include one additional circuit made up of the third conducting path 53 and the third insulator 54.

The third conducting path 53 is fabricated from copper, a copper alloy, aluminum, or an aluminum alloy. The third conducting path 53 is the same as the second conducting path 37, and its repeated explanations are omitted here.

The third insulator 54 is a sheath for the third conducting path 53 and formed by extruding a known resin material. In addition to being formed as a portion for protecting the third conducting path 53, the third insulator 54 is formed also as a portion for insulating the member that exhibits a shield function from the third conducting path 53.

In relation to the configuration and the structure, the intermediate member 51 of the fifth example naturally yields the same advantages as those yielded in the other examples.

Figure 4B:
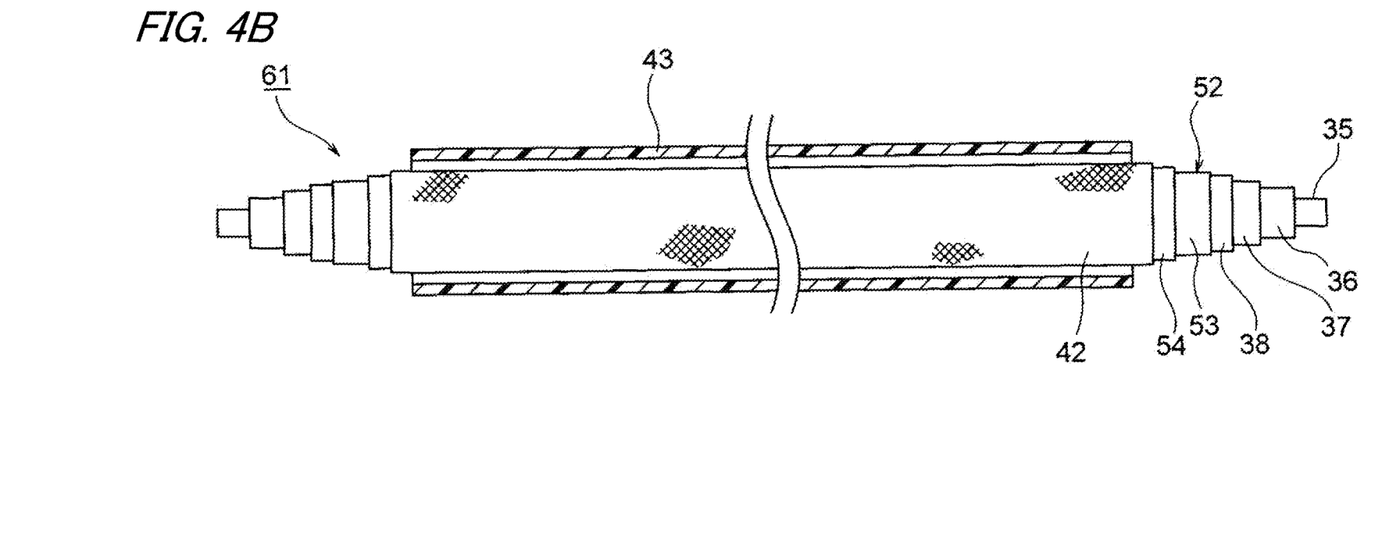
FIG. 4B is a cross sectional view showing a structure of an intermediate member that is to serve as a sixth example.

In FIG. 4B, an intermediate member 61 serving as a specific embodiment (a sixth example) is configured to include the high voltage coaxial composite conducting path 52 and the electromagnetic shield member 42 and the exterior cladding member 43 that are formed in conformance with a diameter of the high voltage coaxial composite conducting path 52. The high voltage coaxial composite conducting path 52 corresponds to the intermediate conducting path, and a portion of the high voltage coaxial composite conducting path 52 corresponds to the intermediate routing path retaining means. Furthermore, the electromagnetic shield member 42 corresponds to the intermediate shield means, and the exterior cladding member 43 corresponds to the intermediate protection means.

In the high voltage coaxial composite conducting path 52, a conductor structure of the first conducting path 35 making up the high voltage coaxial composite conducting path 52 is set so as to exhibit rigidity that holds a cable routing path geometry of the intermediate member 61. In the embodiment, the first conducting path 35 that assumes; for instance, a rod-shaped conductor structure, is adopted.

In relation to the configuration and the structure, the intermediate member 61 of the sixth example naturally yields the same advantages as those yielded in the other examples.

Incidentally, a high voltage coaxial composite conducting path is formed by means of coaxially tying a plurality of circuits into one double circuitry (two circuits), triple circuitry (three circuits), quadruple circuitry (four circuits), . . . n-fold circuitry ("n" circuits). Specifically, a second conducting path and a second insulator are provided outside a first conducting path and a first insulator. Double circuitry is thereby made. In addition, a third conducting path and a third insulator are provided outside the second conducting path and the second insulator, whereby triple circuitry is made. Further, a fourth conducting path and a fourth insulator are provided outside the third conducting path and the third insulator, whereby quadruple circuitry is made. Moreover, "n" conducting paths and "n" insulators are provided outside the quadruple circuitry, whereby "n"- fold circuitry is made. A high voltage coaxial composite conducting path having a coaxial single path configuration can thus be obtained.

Figure 5:
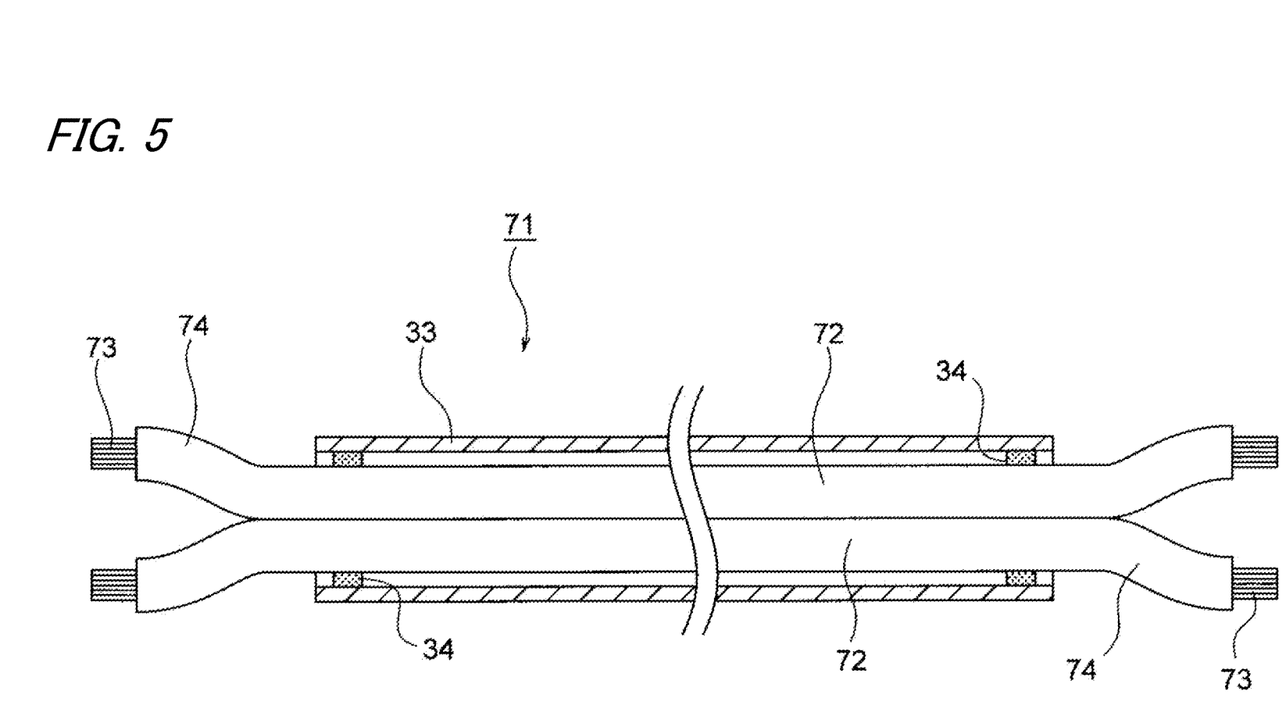
FIG. 5 is a cross sectional view showing a structure of an intermediate member that is to serve as a seventh example.

In FIG. 5, an intermediate member 71 serving as a specific embodiment (a seventh example) is configured to include two high voltage electric wires 72 (conducting paths), the exterior cladding member 33 formed in conformance with a total diameter of the two high voltage electric wires 72, and the conducting path retaining member 34. The high voltage electric wires 72 correspond to the intermediate conducting path, and the exterior cladding member 33 corresponds to the intermediate routing path retaining means, the intermediate shield means, and the intermediate protection means. It is arbitrary to let the structure of the intermediate member include the conducting path retaining members 34.

The two high voltage electric wires 72 are provided for use as a plus circuit and a minus circuit, respectively. Each of the two high voltage circuit wires 72 includes a conductor 73 and an insulator 74. In the seventh example, an conducting path is provided for each circuit rather than a plurality of circuits being implemented into an conducting path of a single configuration.

Although two high voltage electric wires 72 are provided as conducting paths in the embodiment, the conducting paths are not limited to the number of two. The electric wires 72 can also be provided in a number of three or more. Further, a low-voltage electric wire can also be included in the conducting path. The high voltage electric wires 72 can also adopt a conductor structure made by twisting strands or a rod-shaped conductor structure assuming; for instance, a circular cross sectional profile (e.g., a conductor structure that will make up a round single core). In addition, a braided wire into which a conductor is braided, a coated bus bar, and others, can also be adopted, so long as the conducting path is implemented.

As above, the intermediate member 71 of the seventh example naturally yields the same advantages as those yielded in the other examples.

Figure 6A:
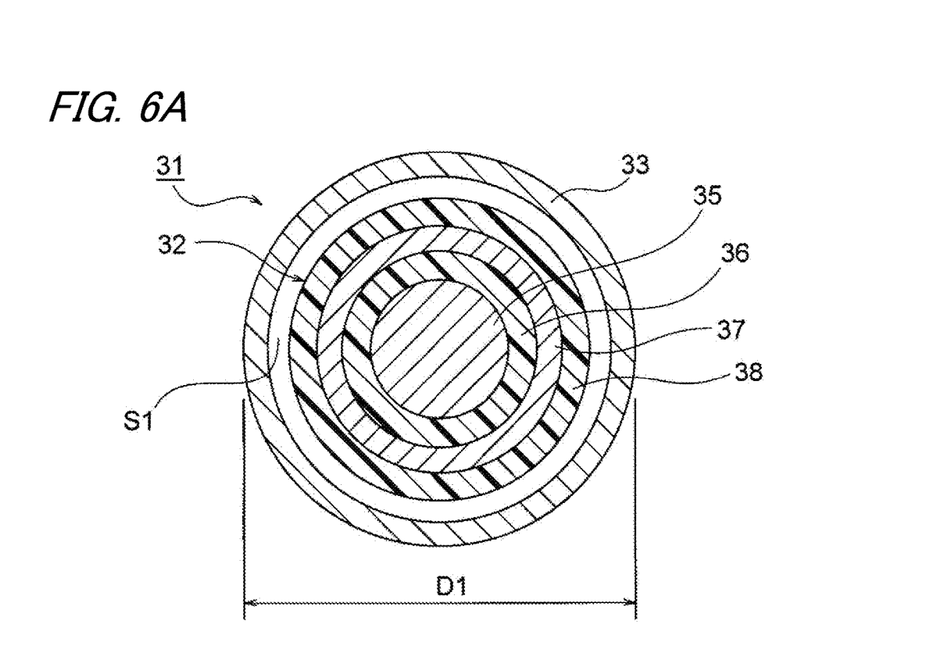
FIG. 6A is a cross sectional view showing the intermediate member that is to serve as the first example.
Figure 6B:
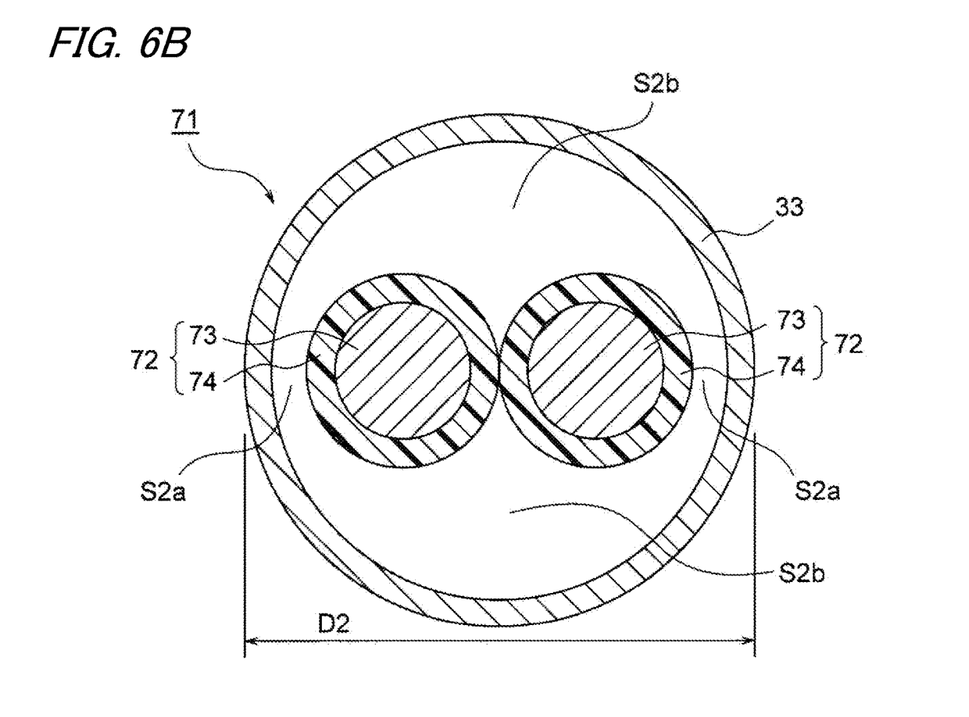
FIG. 6B is a cross sectional view showing the intermediate member that is to serve as the seventh example.

In FIGS. 6A and 6B, as can be seen from a comparison between the high voltage coaxial composite conducting path 32 and the exterior cladding member 33 of the first example and the two high voltage electric wires 72 and the exterior cladding member 33 of the seventh example, the high voltage coaxial composite conducting path 32 is narrower than the two high voltage electric wires 72 arranged side by side, and the exterior cladding member 33 of the first example is narrower (D1<D2) than the exterior cladding member 33 of the seventh example. Specifically, miniaturization is accomplished. In order to pursue miniaturization, using the high voltage coaxial composite conducting path 32 is understood to be effective.

Furthermore, as is seen from FIG. 6A, occupancy of clearance S1 existing between the high voltage coaxial composite conducting path 32 and the exterior cladding member 33 has become smaller than occupancy of clearances S2a and S2b shown in FIG. 6B (i.e., an air layer is smaller). Accordingly, even if an amount of heat building up in the high voltage coaxial composite conducting path 32 becomes larger, the space to be filled with heat is small, which yields an advantage of the space being cooled by the exterior cladding member 33 before being filled with heat. The high voltage coaxial composite conducting path 32, under its own weight or an extra length, is configured so as to make a comparatively large contact with the interior surface of the exterior cladding member 33. Accordingly, the heat building up in the high voltage coaxial composite conducting path 32 is easy to travel to the exterior cladding member 33, which yields an advantage of a high cooling function.

In order to acquire the heat radiation effect, using the high voltage coaxial composite conducting path 32 is understood to be effective.

In FIG. 7, when a predetermined position, such as that designated by arrow A, on the foregoing intermediate member 31 is subjected to bending by use of; for instance, an unillustrated bender machine, the bend 22 due to plastic deformation of the exterior cladding member 33 is formed in the thus-bent portion. A bent shape conforming to the cable routing path is thereby formed. Reference numeral 24 designates metallic clamps used as fastening members. The fastening members, such as the clamps 24, can also be used as body grounds.

Subsequently, specific embodiments of the terminal member 16 (see FIGS. 1A and 1B) are now described by reference to FIGS. 8 to 10.

In FIG. 8, the terminal member 81 that serves as a specific embodiment (a first example) is configured to include two equipment connection high voltage electric wires 82; terminal fitting 83 provided at one end of each of the two equipment connection high voltage electric wires 82; the electromagnetic shield member 84 that covers and shields the two equipment connection high voltage electric wires 82; a shield shell 85 and a shield ring 86 that are provided at one end of the electromagnetic shield member 84; and an unillustrated shield ring for fastening (swaging or the like) the other end of the electromagnetic shield member 84 to; for instance, the exterior cladding member 33 (see FIGS. 2A and 2B) of the intermediate member 31.

The other ends of the two equipment connection high voltage electric wires 82 are formed so as to be able to be connected to; for instance, the first conducting path 35 and the second conducting path 37 of the intermediate member 31 (the connection shall be insulated by means of; for instance, an insulation tape or molding). One of the two equipment connection high voltage electric wires 82 is for use as a plus circuit, and the other one is for use as a minus circuit. The shield shell 85 is configured to be fastened to an unillustrated shield case of the inverter unit 4 or the battery 5 (see FIGS. 1A and 1B), to thus enable grounding.

A braid is used for the electromagnetic shield member 84 in the embodiment (however, the electromagnetic shield member is not limited to the braid but can also be a known metal foil elementary substance, a film including a metallic foil, and the like).

In FIG. 9, a terminal member 91 that serves as a specific embodiment (a second example) is configured to include the one equipment connection high voltage electric wire 82; the terminal fitting 83 provided at the forefront of the equipment connection high voltage electric wire 82; another terminal fitting 83 to be provided at one end of the extension 40 (see FIGS. 2A and 2B) of; for instance, the intermediate member 31; the electromagnetic shield member 84 that covers and shields the equipment connection high voltage electric wire 82 and the extension 40; the shield shell 85 and the shield ring 86 that are provided at one end of the electromagnetic shield member 84; and an unillustrated shield ring for fastening (swaging or the like) the other end of the electromagnetic shield member 84 to; for instance, the exterior cladding member 33 (see FIGS. 2A and 2B) of the intermediate member 31.

The other end of the equipment connection high voltage electric wire 82 is formed so as to be able to be connected to; for instance, the second conducting path 37 of the intermediate member 31 (the connection shall be insulated by means of; for instance, an insulation tape or molding).

In FIG. 10, a terminal member 101 that serves as a specific embodiment (a third example) is configured to include two equipment connection high voltage electric wires 102; an electromagnetic shield member 103 that covers and shields the two equipment connection high voltage electric wires 102; and a shielded electric wire 105 that has a sheath 104 for covering the electromagnetic shield member 103. The terminal member 101 also includes the terminal fitting 83 provided at one end of each of the two equipment connection high voltage electric wires 102; the shield shell 85 and the shield ring 86 that are provided at one end of the electromagnetic shield member 103; and an unillustrated shield ring for fastening (swaging or the like) the other end of the electromagnetic shield member 103 to; for instance, the exterior cladding member 33 (see FIGS. 2A and 2B) of the intermediate member 31.

The other ends of the two equipment connection high voltage electric wires 102 are formed so as to be able to be connected to; for instance, the first conducting path 35 and the second conducting path 37 of the intermediate member 31 (the connection shall be insulated by means of; for instance, an insulation tape or molding). One of the two equipment connection high voltage electric wires 102 is for use as a plus circuit, and the other one is for use as a minus circuit.

It is apparent that various modifications can be made in the invention within a scope not deviating from the gist of the invention.

The present invention is useful for providing an intermediate member that enables enhancement of productivity of a wire harness, and for providing a wire harness including such an intermediate member.

What is claimed is:

1. A wire harness comprising:
   a pair of terminal members flexibly bendable in a desired direction, each terminal member including:
     an electromagnetic shield member;
     at least one terminal conducting path having a distinct first end and a distinct second end, and passing through the electromagnetic shield member; and
     a terminal fitting having a distinct first end connected to the first end of the terminal conducting pathway and having a distinct second end configured to be electrically connected to equipment; and
   an intermediate member separate from and configured to be connected to each of the terminal members, the intermediate member including:
     at least one intermediate conducting path separate and distinct from the at least one terminal conducting path, and having a distinct first end configured to establish an electrical interconnect with the second end of the at least one terminal conducting path of one of the terminal members if connected to the one terminal member, and a distinct second end configured to establish an electrical interconnect with the second end of the at least one terminal conducting path of another one of the terminal members if connected to the another terminal member;
     intermediate routing path retaining means configured to retain a routing path geometry of the at least one intermediate conducting path;
     intermediate shield means configured to cover and electromagnetically shield the at least one intermediate conducting path, and configured to be connected to the electric shield members; and
     intermediate protection means configured to cover and protect the at least one intermediate conducting path
   wherein the at least one intermediate conducting path includes a first conducting path, a first insulator sheathing an outer periphery of the first conductor path, a second conducting path laying outside of the first insulator, and a second insulator sheathing the outer periphery of the second conducting path.

2. The wire harness according to claim 1, wherein
   a single component serves as the intermediate routing path retaining means, the intermediate shield means, and the intermediate protection means.

3. The wire harness according to claim 1, wherein the intermediate routing path retaining means is a metal pipe having at least one bend, and the metal pipe defines the routing path geometry.

4. The wire harness according to claim 1, wherein the at least one intermediate conducting path includes twisted strands.

5. The wire harness according to claim 1, wherein the at least one intermediate conducting path includes a rod-shaped conductor.

6. The wire harness according to claim 1, wherein the at least one intermediate conducting path includes a rod-shaped conductor that defines the routing path geometry.

7. The wire harness according to claim 1, further comprising one or a plurality of retaining members located between the intermediate protection means and the at least one intermediate conducting path.

8. The wire harness according to claim 1, wherein the distinct first end and the distinct second end of the terminal conducting path extend beyond the electromagnetic shield member.

* * * * *